April 4, 1950 R. J. BRANSON 2,503,190
METHOD OF FORMING SPHERICAL CONTAINERS
Filed April 7, 1947 3 Sheets-Sheet 1

INVENTOR
R. J. Branson
BY
C. M. McKnight
ATTORNEY

April 4, 1950     R. J. BRANSON     2,503,190
METHOD OF FORMING SPHERICAL CONTAINERS
Filed April 7, 1947     3 Sheets-Sheet 2

INVENTOR
*R. J. Branson*
BY
*C. M. McKnight*
ATTORNEY

April 4, 1950  R. J. BRANSON  2,503,190
METHOD OF FORMING SPHERICAL CONTAINERS
Filed April 7, 1947  3 Sheets-Sheet 3

INVENTOR
R. J. Branson
BY
C. M. McKnight
ATTORNEY

Patented Apr. 4, 1950

2,503,190

UNITED STATES PATENT OFFICE 2,503,190

METHOD OF FORMING SPHERICAL CONTAINERS

Raymond J. Branson, Tulsa, Okla., assignor to McNamar Boiler & Tank Company, Inc., Tulsa, Okla., a corporation of Oklahoma Application April 7, 1947, Serial No. 739,789

5 Claims. (Cl. 29—148.2)

This invention relates to spherical tanks and more particularly but not limited thereto, to the method of forming spherical tanks adapted to be used in the storage and transportation of fluids under pressure, such as liquefied petroleum gases and volatile liquids.

The most common present day method of forming spherical tanks consists of die shaping or forming individual segments of the sphere which are welded together in edge to edge relation to complete the spherical body. It will be apparent that such procedure involved considerable die and machinery expense, cost of welding footage as well as considerable time for setting up the numerous segments so that they are in a position to be welded. Furthermore, it is known that bodies have been reshaped by hydraulic pressure, particularly by the application of hydraulic pressure utilizing external shaping dies in the stretching or reshaping process. Furthermore, the bulging or stretching of a cylindrical body into a partially spherical shape is disclosed by several of the Debor patents, particularly numbers 2,106,495 and 2,106,496. However, the present invention clearly avoids any of the aforementioned methods in its novel concept of forming a spheroid.

The present method is concerned with the forming of a spherical body by the hydraulic application of a fluid such as oil or water to a closed cylindrical body of predetermined dimensions in such a manner that the cylindrical body is bulged by the hydraulic pressure to form a substantially symmetrical spheroid body of predetermined diameter.

The hydraulic method employing oil or water to create a bulging has many advantages, particularly in that all or the greater part of the metal is stretched to allow for an increase of area. Furthermore the stretching is substantially uniform and the metal thickness throughout the stretched body is substantially constant, and materials of a lower tensile strength may be utilized.

It is an important object of this invention to provide a novel method of forming a high pressure vessel of substantial spherical shape without the use of dies or the like.

And still another object of this invention is to provide a method for forming various sized spherical bodies of substantially symmetrical shape by a hydraulic bulging of the metal.

And still another object of this invention is to form a spherical body employing the hydraulic application of fluid for bulging the body from one shape into another wherein the bulging is done gradually to allow the metal sufficient time to stretch in the bulging operation.

And still another object of this invention is to form a spherical body by the application of hydraulic pressure in such a manner that the finished spherical vessel is assured of a safety factor for the bursting pressure within the confines of the A. S. M. E. code.

And still an additional object of this invention is to form a spherical tank from a cylindrical body employing hydraulic pressure to bulge or reshape the cylindrical body into a substantial symmetrical spheroid wherein the welding footage is substantially decreased and a considerable portion of the time for setting up the welding operation is eliminated, thereby providing a more economical and efficient method for forming a spherical tank.

Other objects and advantages of the invention will be evident from the following detailed description, read in conjunction with the accompanying drawings, which illustrate my invention.

In the drawings, Figure 1 is a perspective view of part of the segments of the cylindrical body before welding.

Figure 1:
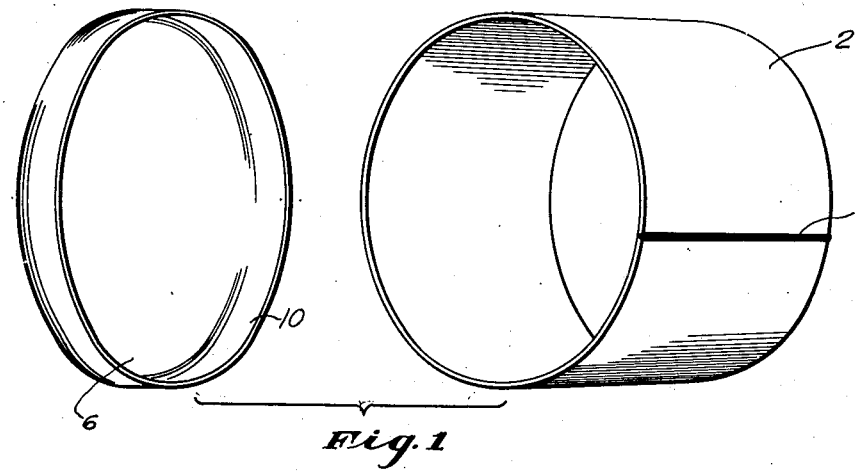
Figure 2:
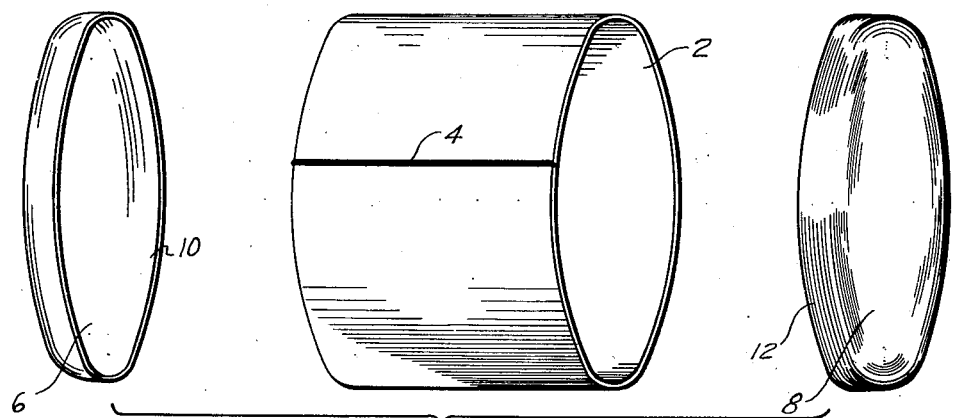
Figure 2 is a similar view of all the segments shown in disassembled relationship.

Referring to the drawings in detail the herein novel method comprises forming a substantial cylindrical shell 2 by rolling a metal sheet of a desired thickness on a forming roll (not shown) into a cylindrical configuration; the ends are then welded at 4 providing a cylinder having a predetermined diameter as will be hereinafter set forth. The cylindrical body 2 is adapted to be closed by a pair of flat head members 6 and 8 respectively, each of which are formed with outwardly extending flanges 10 and 12, respectively. The heads 6 and 8 are secured to the cylindrical body 2 by welding as clearly shown at 14 and 16 in Figure 3 to provide a closed cylindrical body. The closed cylindrical body 2 is provided with a coupling 18 welded thereto in order to provide an inlet aperture for connection with a fluid nipple 20 as clearly shown in Figure 4. The nipple 20 communicates with a connecting fluid conduit 22 through a T-connection 24. The conduit 22 is directly connected with a hydraulic pump 26 for the employment of hydraulic pressure as will be hereinafter set forth. A control valve 28 is interposed in the conduit 22 between the body 2 and pump 26. A pressure line 29 is in communication with the T-connection 24 providing communication with a pressure gauge 30. A control valve 32 is interposed between the gauge 30 and the inlet T-connection 24.

In order to form a spherical vessel of a desired diameter, the present method utilizes a constant multiple for the longitudinal and diametrical dimensions of the cylindrical body 2. It has been determined that in the forming of a sphere that the displacement of the material plus the elongation thereof must be considered, and particularly in hydraulic expansion where the body is substantially under tension at all times. As a consequence the constant multiple for determining the longitudinal and diametrical dimensions for the cylindrical body 2 has considered that the relationship of the displacement and elongation factors must substantially equal an overall circumference of the sphere desired. Furthermore, since the factors of elongation and displacement are variable depending upon the thickness and the tensile strength of the metal or material, the final determination of the constant multiple was made through the trial and error procedure. In forming a spherical body with the present method any size spherical tank may be formed. It is only necessary to determine the volume of tank desired in gallons, whether it is a 150 gallon tank or 5,000 gallon tank, and the diameter of such a tank may easily be determined from conventional tables or formulas. Once the diameter of the particular tank desired is known, the overall length for the cylindrical body 2 between the heads 6 an 8 may be determined by multiplying the tank diameter by the constant multiple. It has been found that the length multiple on the trial and error basis for forming tanks from one-quarter inch steel of low tensile strength is .6167 and this factor multiplied by the determined diameter of a spheroid of desired capacity will result in the required length of the body 2 between the heads 6 and 8. The constant multiple in determining the diameter of the body 2 is .8834 regardless of the outside diameter of the sphere to be formed. This constant multiple factor multiplied by the predetermined diameter of the sphere to be formed will result in the overall diameter of the flat end members 6 and 8 as well as the diameter of vessel 2.

Figure 3:
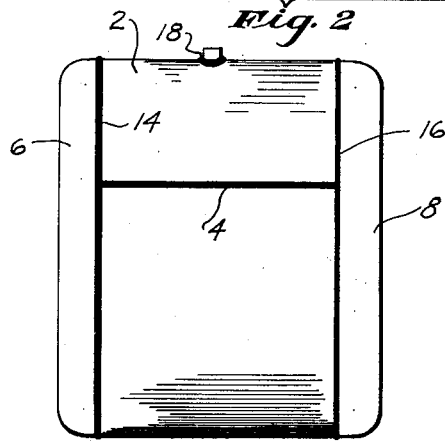
Figure 3 is a front elevational view of the cylindrical body shown in welded relationship.
Figure 4:
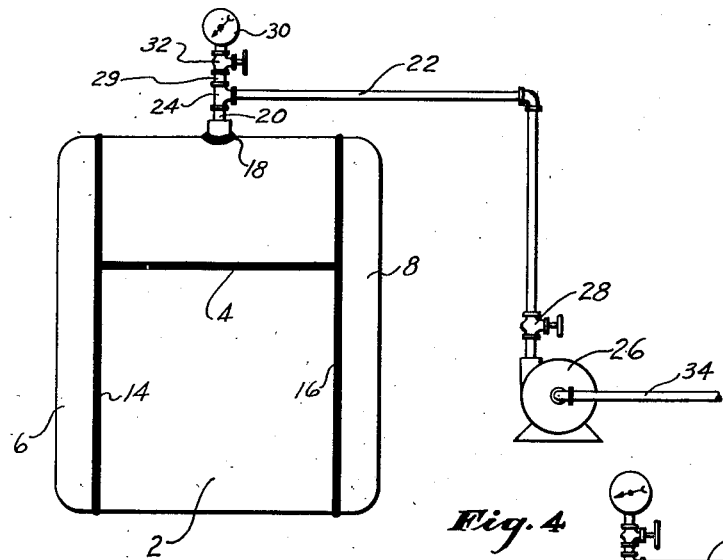
Figure 4 is a front elevational view of a cylindrical body incorporating the hydraulic pressure apparatus.
Figure 5:
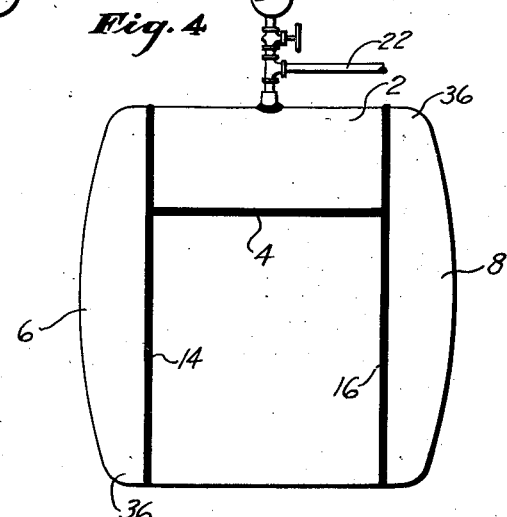
Figure 5 is a similar view at one stage of the hydraulic bulging operation.
Figure 6:
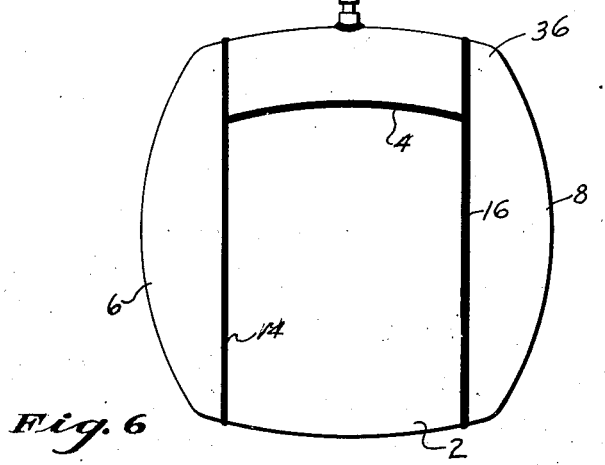
Figure 6 is a similar view at another stage of the operation.

With the cylindrical body 2 closed by the heads 6 and 8, and of proper predetermined dimensions in length and diameter, the hydraulic apparatus, as shown in Figure 4, is place in communication with the interior of the cylindrical tank 2. The inlet conduits 20 and 22 provide communication from the hydraulic pump 26 which in turn communicates through a conduit 34 with a fluid storage tank (not shown), in order to supply the cylindrical vessel 2 with water or oil. The cylindrical vessel 2 is filled with fluid to build up the pressure, and after filling any continued discharge of fluid under pressure into the vessel 2 will cause a bulging thereof. It has been found under practical tests that upon the application of hydraulic pressure of approximately 150 pounds per square inch, the heads 6 and 8 will start to bulge slightly outwardly, as clearly shown in Figure 5. A continued application of hydraulic pressure will increase the bulging of the flanged heads outward, as well as provide a bulging of the longitudinal body 2 into a slightly elliptical shape, as clearly shown in Figure 6. Further application of pressure against the interior of the shell 2 will reshape the cylindrical body 2 of Figure 3 into a substantially symmetrical spheroid body, as clearly shown in Figures 7 and 8. It is well known that in the stretching of a closed body by hydraulic pressure, that substantially all the body material is placed under tension. With the cylindrical body 2 being under tension during the bulging operation for forming the spheroid, the steel material at the knuckle joint 36 of the flanged heads 6 and 8 will be under such tension to displace or reshape the material adjacent this part 36 to increase the radius for an equalization of the overall diameter. In the terminology of sheet metal fabrication the term "knuckle joint" generically means any inside corner radius of a vessel. In the present instance "knuckle joint" may be defined as where "the body of a vessel in one plane connects with a portion of the body in a substantially different plane." However after displacement of the metal at this joint 36, continued elongation of the cylinder and the elongation of the end section 6 and 8 due to the tension is substantially uniform in order to bulge or stretch the body into a substantially symmetrical spheroid, as clearly shown in Figures 7 and 8.

As a practical illustration of the invention, shown in Figures 1 to 8 inclusive, assuming that a tank having a capacity or volume of 150 gallons is desired. For a low pressure tank of two hundred pounds per square inch, a metal of low tensile strength and approximately one-quarter inch thick is sufficient. From the conventional conversion tables it can easily be determined that a spherical tank of such volume would have a diameter of approximately forty-one inches. In order to determine the overall length of the cylindrical body 2, the constant multiple .6167 multiplied by the 41 inches will provide a result approximately 25 and $\frac{7}{8}$ inches. To determine the approximate diameter of the body and heads, the constant multiple .8834 multiplied by 41 inches will give a result of approximately 36 and $\frac{3}{16}$ inches. It will be apparent that these constant multiples may be utilized with any known diameter of a spherical tank having a predetermined thickness and tensile strength to provide the correct dimensions of a cylindrical body to be reshaped into a spheroid.

It will be apparent that the present method forms a spherical vessel from a cylindrical body of predetermined dimensions through the application of hydraulic pressure, and particularly without the use of any dies to assist in the shaping of the material during the formation period. Furthermore, the hydraulic pressure can be applied without any excessive pressure concentrating in any one place. The material utilized in constructing the cylindrical body is the same as any other material for pressure vessels of this type. It will be apparent there is a considerable saving in waste material over the preformed segment type of construction. Furthermore, it will be apparent that there is considerable less material in the cylindrical body 2 as shown in Figure 3 and consequently there is a saving in the materials used from that of the more conventional types of construction. Under practical applications it is found that the present method saves considerable welding footage amounting to approximately thirty percent as well as the saving in the set up time necessary in the more conventional construction, such, for example, as the die shaped segmental type method of construction.

The present hydraulic method in addition to bulging or stretching a cylindrical body into a substantially spherical shape functions to provide a testing operation for the safety factor in pressure vessels of this type. It is well known that the A. S. M. E. code requires a 5 to 1 safety factor for the theoretical bursting pressure in this type of vessel, therefore a tank designed for 200 pounds per square inch must be able to stand a test of 1,000 pounds per square inch to assure the proper safety factor under the A. S. M. E. code. In the present illustration hereinbefore set out, it has been found that the pressure required to reshape the cylindrical body into a substantially spherical vessel is approximately 1050 to 1075 pounds per square inch, thereby providing a A. S. M. E. test simultaneous with the forming or reshaping of the metal into the spherical body. Although the present method need not utilize any external shaping dies, it will be apparent that the dies or other means (not shown) of external pressure may be applied to assist in the formation of tanks of this type, especially spherical tanks of much larger diameter and overall circumference.

Figure 7:
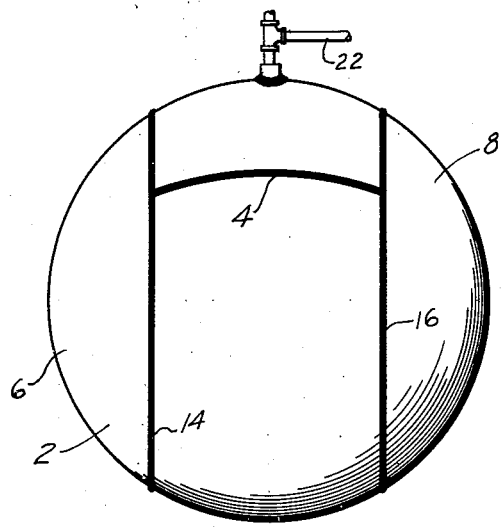
Figure 7 is a similar view showing the substantially final stage of the bulging or reshaping operation.
Figure 8:
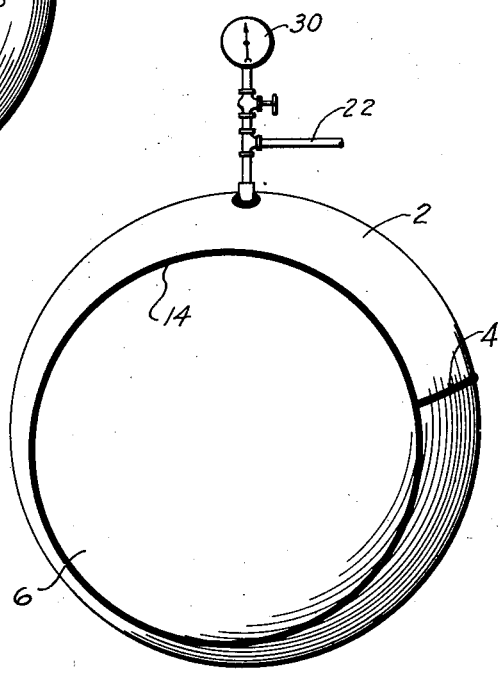
Figure 8 is a view taken at substantially right angles to Figure 7 showing the final stage of the bulging operation.

The spherically expanded sections, as shown in Figures 7 and 8, are possessed of all the favorable mechanical properties and characteristics of a sphere which normally has twice the mechanical strength of a cylinder for the same internal stress of its unit of area. Furthermore, the elongation of the material in the present expanded spherical body is such that the original thickness of the material does not decrease in any substantial amount and maintains its necessary mechanical strength per unit of area.

From the foregoing it will be apparent that the present invention provides a novel method of reshaping a cylindrical body into a spheroid which is economical and simple in its operation. Furthermore, the method forms a spherical tank with considerable economy in both labor and welding footage, at the same time functioning as a test for the expanded spherical vessel in conformance of the safety factors of the A. S. M. E. code. Various sized spheroids having variable pressure requirements may be easily and expeditiously formed by providing the proper constant multiple based on the displacement and elongation factors of particular material in order to provide a cylindrical body of predetermined dimensions capable of being stretched or reshaped into substantially symmetrical sphere by the application of hydraulic pressure. Furthermore it will be apparent that the flanges for the head members of the cylindrical body may be varied from a horizontal disposition in that they may be disposed at an angle to the horizontal and connect with an angled or bent portion of the cylindrical body.

Changes may be made in the specifications and drawings without departing from the spirit of the invention within the scope of the following claims, as set forth.

What I claim is:

1. The method of forming a spherical container from a closed cylindrical body which consists of providing a cylinder having open ends, butt welding the ends of the cylinder with flat heads having extension flanges of substantially the same thickness and tensile strength as the cylinder to provide curved knuckle joints, expanding the closed cylinder by internal hydraulic pressure to place the material under tension, utilizing the tension to increase the radius of the contour at the knuckle joint between the heads and the cylinder, continuously applying the hydraulic pressure until the cylinder is reshaped into a spherical configuration.

2. The method of forming a spherical container from a closed cylindrical body which consists of providing a cylinder having open ends, butt welding the ends of the cylinder with flat heads having extension flanges of the same thickness and tensile strength as the cylinder to provide curved knuckle joints, expanding the closed cylinder by internal hydraulic pressure to place the material under tension, utilizing the tension to increase the radius of the contour at the knuckle joint between the heads and cylinder, continuously applying the hydraulic pressure until the cylinder is reshaped into a spherical configuration, with a simultaneous testing of the reshaped container for the theoretical bursting pressure of the material.

3. The method of forming a spherical container from a closed cylindrical body which consists of providing a cylinder having open ends, connecting the ends of the cylinder with flat heads having extension flanges of substantially the same thickness and tensile strength as the cylinder, expanding the closed cylinder by internal hydraulic pressure to place the material under tension, utilizing the tension to increase the radius at the connecting point between the head and the ends, continuously applying the hydraulic pressure until the cylinder is reshaped into a spherical configuration.

4. The method of forming a spherical container from a closed cylindrical body which consists of providing a cylinder of pre-determined dimensions of length and diameter based on displacement and elongation factors of the material, connecting the ends of the cylinder with flat heads having extension flanges of substantially the same thickness and tensile strength as the cylinder to provide curved knuckle joints, expanding the closed cylinder by internal hydraulic pressure to place the material under tension, continuously applying the hydraulic pressure for increasing the radius of contour at the knuckle joints between the heads and the ends of the cylinder for reshaping the closed cylinder into a spherical configuration.

5. The method of forming a spherical container from a closed cylindrical body which consists of providing a hollow cylinder, butt welding the ends of the cylinder with flat discs of substantially the same diameter as the cylinder and having outwardly extending flanges of the same thickness and tensile strength as the cylinder to provide curved knuckle joints, expanding the closed cylinder by internal hydraulic pressure for placing the material under tension, utilizing the tension to increase the radius of the contour at the knuckle joint between the heads and the cylinder, continuously applying hydraulic pressure until the cylinder is reshaped into a spherical configuration.

RAYMOND J. BRANSON.

REFERENCES CITED

The following references are of record in the file of this patent:

UNITED STATES PATENTS

| Number | Name | Date |
|---|---|---|
| 2,106,495 | Debor | Jan. 25, 1938 |
| 2,106,496 | Debor | Jan. 25, 1938 |
| 2,186,185 | Walker | June 9, 1940 |

FOREIGN PATENTS

| Number | Country | Date |
|---|---|---|
| 360,442 | Italy | Mar. 21, 1938 |